Sept. 1, 1959 — C. L. CATES — 2,902,101
CONVEYOR
Filed May 15, 1956 — 2 Sheets-Sheet 2
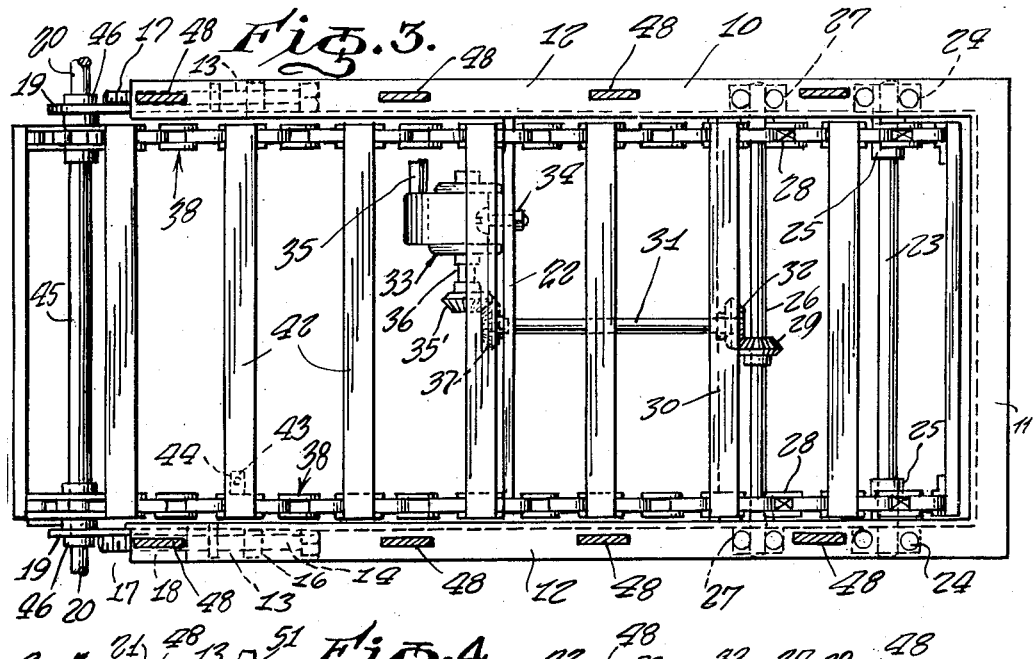
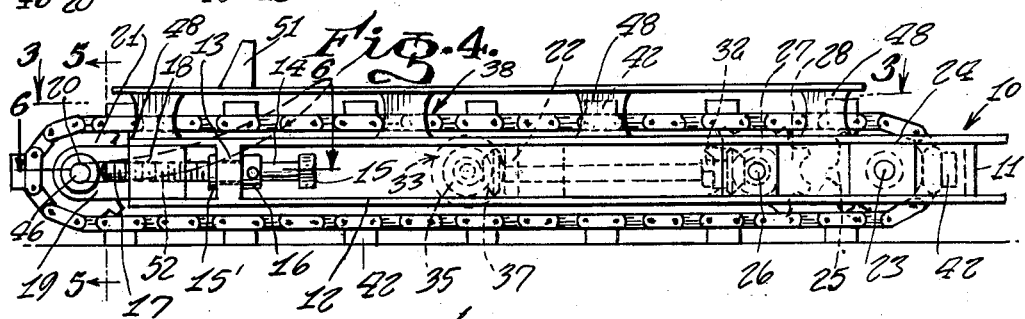
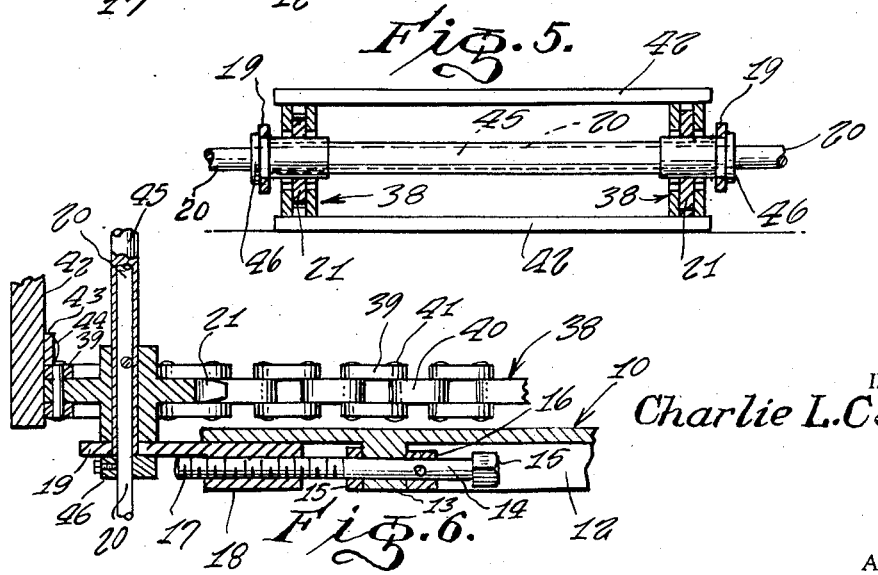
INVENTOR
Charlie L. Cates.
ATTORNEY

United States Patent Office 2,902,101
Patented Sept. 1, 1959

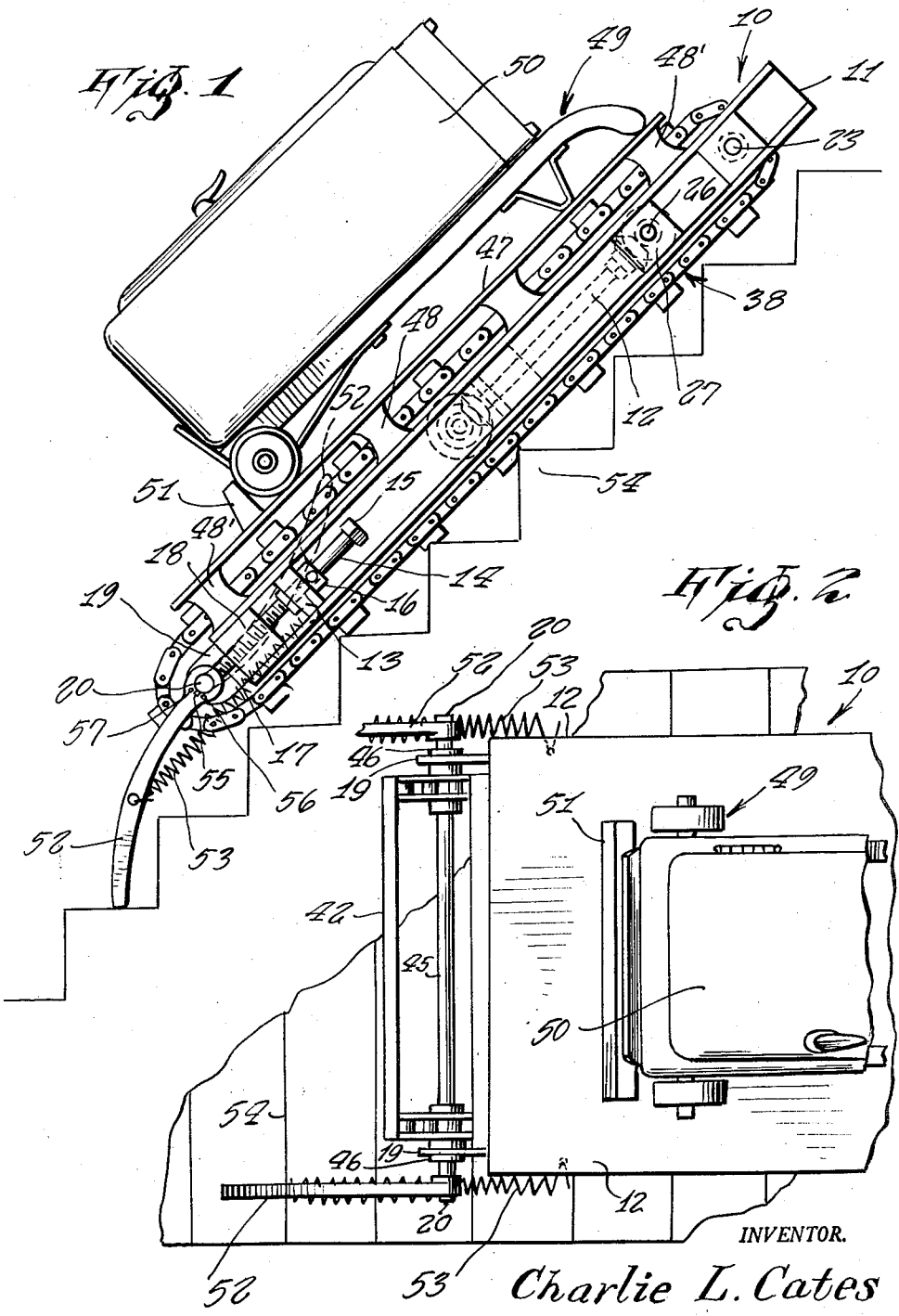

2,902,101

CONVEYOR

Charlie Leroy Cates, Mansfield, Ohio

Application May 15, 1956, Serial No. 584,953

1 Claim. (Cl. 180—9.42)

This invention relates to conveyors.

It is an object of the present invention to provide an endless tread type conveyor for hauling a regulation two-wheel hand truck loaded with a refrigerator or like appliance up a flight of stairs with a minimum of time and effort on the part of the operator.

It is another object of the present invention to provide a conveyor of the above type which may be used on the floor of a factory for the handling and moving of materials without the above mentioned hand truck.

Other objects of the invention are to provide a conveyor bearing the above objects in mind which is of simple construction, has a minimum number of parts, is inexpensive to manufacture, and efficient in operation.

For other objects and for a better understanding of the invention, reference may be had to the following detailed description taken in connection with the accompanying drawing, in which:

Figure 1 is a side elevational view of a preferred embodiment of the present invention shown in operative use for transporting a loaded hand truck up a flight of stairs;

Fig. 2 is a fragmentary top plan view thereof;

Fig. 3 is a horizontal sectional view taken along the line 3—3 of Fig. 4;

Fig. 4 is a side elevational view of the device shown in use on a factory floor or the like;

Fig. 5 is a transverse vertical sectional view taken along the line 5—5 of Fig. 4; and Fig. 6 is an enlarged horizontal sectional view taken along the line 6—6 of Fig. 4.

Referring now more in detail to the drawing, and more particularly to Figs. 3 through 6, 10 represents a three-sided rectangular frame of U-shaped cross section (Fig. 4) having the central portion 11 and the side portions, substantially as illustrated. The rear end of the frame 10 is open and the side portions 12 near this open end are integrally formed with the bearing members 13. Elongated bolts 14 having the hexagonal heads 15 are rotatably mounted in the bearing blocks 13, being prevented against angular displacement therethrough by means of the collars 15' and 16 with the externally threaded portions 17 of the bolts extending rearwardly towards the open end of the frame.

Internally threaded blocks 18 are adjustable on the rear ends of the bolts 14 and more particularly the externally threaded portion 17 thereof, the inner face of the blocks 18 abutting the web portion of the frame 10 (Fig. 6). The rear ends of the blocks 18 are integrally formed with the rearwardly extending plates which fixedly mount the transverse shaft 20. It will be noted that the ends of the shaft extend outwardly beyond the outer edges of the flange portions of the frame 10 for a purpose which will hereinafter become clear.

A first pair of sprockets 21 are keyed to the opposite ends of a sleeve 45 surrounding the fixed shaft 20 adjacent the inner faces of the extensions 19 for a purpose which will hereinafter become clear.

A transverse brace 22 connects the web portions of the sides 12 intermediate their ends.

A second shaft 23 is rotatably mounted at opposite ends in the ball bearing assemblies 24 located near the central portion 11, a second pair of sprockets 25 being keyed to the ends of the shaft 23 adjacent the inner faces of the flange portion of the sides 12.

A third shaft 26 is rotatably mounted in the ball bearing assemblies 27 positioned inwardly and laterally aligned with the shaft 23, a third pair of sprockets 28 being keyed to the ends of the shaft 26 adjacent the inner faces of the flange portion of the sides 12. A first bevel gear 29 is keyed to the shaft 26 intermediate the ends thereof.

A second transverse brace 30 connects the sides 12 adjacent the shaft 26 and cooperates with the brace 30 to rotatably mount the longitudinal shaft 31 having a bevel gear 32 keyed to the end thereof in mesh with the bevel gear 29 (Figs. 3 and 4).

A reversible electric motor indicated generally at 33 is fixedly mounted on the rear face of the brace 22 by means of the nut and bolt assembly 34 and includes an electric cord 35 terminating in a male plug, not shown, by means of which the motor 33 may be connected to a household source of power. A bevel gear 35' is keyed to the end of the drive shaft 36 of the motor, the bevel gear 35' being in mesh with the bevel gear 37 keyed to the rear end of the shaft 31 whereby to rotate the sprockets 28, which are the drive sprockets.

An endless chain indicated generally at 38 (Fig. 6) is positioned adjacent the inner sides of the sides 12 and is mounted on the sprockets 21, 25 and 28, as will be obvious. The chain 28 includes the laterally spaced pairs of links 39 which are pivotally connected at opposite ends to the intermediate links 40 by means of the pins 41. The belt 38 may be tightened or loosened by means of the bolts 14 previously described which move the shaft 20 longitudinally to the desired adjustment. A plurality of laterally extending wooden slats 42 are connected at opposite ends in suitable manner to every third link of the chain 38 and are adapted to engage the supporting surface as well as to support the object being moved, as will be obvious. For example, as shown in Fig. 6, the plates 43 are integrally formed at right angles to the innermost of the laterally spaced links 39 and are secured to the slats 42 by the bolts 44.

As shown in Fig. 5, a spacer sleeve 45 to which the sprockets 21 are fixed surrounds and is rotatably supported upon the shaft 20, the opposite ends of the shaft 20 being secured to the outer faces of the plates 19 by means of the enlarged flange portions 46.

A horizontal tabular portion 47 for supporting the object being transported is positioned above the upper stretch of the belt 38 and is supported on the uppermost flanges of the sides 12 by means of the vertical brackets 48'.

By positioning the hand cart indicated generally at 49 (Fig. 1) on the tabular supporting portion 47, the device may be used for moving the hand cart and its load 50 across warehouse floors or the like with a minimum of time and effort on the part of the operator. Suitable switch means, not shown, will be connected in series with the motor 33 to permit the reversing of the direction and the stopping of the device.

As shown in Fig. 1, the tabular portion 47 is provided with a transverse stop 51 for a purpose which will hereinafter become clear.

An shown in Figs. 1 and 2, a pair of arcuate stops 52 are pivotally mounted on the ends of the shaft 20 and are normally retained in a retracted position by means of the coil spring 53 connected at one end to the center of the stops 52 and at the other end to the sides 12. By means of the stop 51, and the spring stops 52, the device may be used for moving the hand cart 49 and its load 50 up the stairs 54, as shown in Fig. 1. In this case the stops 52 are urged to the outer position against the action of springs 53 and, as the device moves up the stairs, will snap onto each successively higher step to prevent the downward displacement of the device in the event that the motor is stopped, the angular displacement of the stops 52 relative to the shaft 20 being limited in the extreme position of Fig. 1 by means of the stop pin 55 fixedly carried by the fixed shaft 20 and the stop pin 56 fixedly carried by the inner end of the stops 52. When the device is used on the horizontal supporting surface of Fig. 4, the stop 52 will be in the inoperative position shown in phantom. The stop 51 will prevent the downward movement of the hand cart 49 on the tabular portion 47, when the device is climbing the stairs 54.

A removable stop pin 57 is positioned on the other side of the pin 55 to prevent the collapsing of the spring latches 52 when in the operative position. Upon removing the pins 57, the latches may then be retracted to the inoperative position for horizontal movement.

The sides of the frame 10 may also be provided with bumpers, not shown, which will protect the walls when being used to transport the hand truck up the stairs 54. Such bumpers may also serve as handles for carrying the device when not in use.

It should now be apparent that there has been provided a caterpillar type conveyor for hauling a regulation two wheel hand truck, loaded with a refrigerator or like appliance, up stairways and over horizontal surfaces, for example, the floors of factories for the handling and moving of materials, in which latter case the hand truck can be eliminated.

The forward end of the frame 10 at the central portion 11 may also be provided with a swivel wheel, not shown, having a telescopic supporting shaft for handling the load on the conveyor. Such a swivel shaft is retractable and would collapse under the conveyor when not in use.

The motor 36 may also be provided with a worm, instead of the bevel gear 35, in mesh with the worm gear instead of the bevel gear 37, so that the device will not reverse when the motor is turned off and which will prevent the conveyor from moving back down the stairs.

While various changes may be made in the detail construction, it shall be understood that such changes shall be within the spirit and scope of the present invention as defined by the appended claim.

What I claim as new and desire to protect by Letters Patent of the United States is:

A conveyor comprising, in combination, a U-shaped frame, a first lateral shaft, means fixedly mounting said first shaft across the open end of said frame and permitting its longitudinal adjustment relative thereto, a first pair of sprockets secured to the ends of said first shaft, a second shaft journalled at the other end of said frame inwardly of the central portion thereof, a second pair of sprockets secured to the ends of said second shaft inwardly of said frame sides, a pair of laterally spaced endless chains positioned on said first and second sprockets, electrically powered means for driving said sprockets and chains, a horizontal supporting surface, means for supporting said horizontal surface above said chains on said frame, transverse members connecting said chains, stop means carried by said horizontal supporting portion at the rear end thereof to prevent rearward displacement thereon of a hand cart or the like when said supporting surface is inclined on a flight of stairs or the like, and stop means for preventing the movement of said conveyor down a flight of stairs under the action of gravity when said chains are idle, said electrical means for driving said chains comprising a first transverse brace connecting the sides of said frame, a second transverse brace connecting the sides of said frame spaced forwardly of said first brace, a third transverse shaft journalled in the sides of said frame forwardly of said first shaft, a third pair of sprockets secured to said third shaft at the ends thereof, said sprockets being in mesh with said chains, a longitudinal shaft journalled at opposite ends in said transverse braces, a first bevel gear secured to the forward end of said longitudinal shaft, a second bevel gear secured to said third transverse shaft in mesh with said first bevel gear, an electric motor mounted on said first transverse brace, a third bevel gear mounted on the drive shaft of said electric motor, and a fourth bevel gear secured to the rear end of said longitudinal shaft, said third and fourth bevel gears being in mesh with each other, said electric motor being reversible, said stop means comprising the ends of said first shaft extending laterally beyond said frame, a pair of arcuate stops rotatably mounted on the ends of said first shaft, spring means for normally retracting said arcuate stops against the sides of said frame, a stop pin carried by said first shaft at the ends thereof, a second stop pin carried by each of said arcuate stops and adapted to limit their outward displacement by abutment with said first stop, and a removable second stop pin carried by said arcuate stops adapted to limit their inward movement when the device is being used on a flight of stairs.

References Cited in the file of this patent

UNITED STATES PATENTS

| | | |
|---|---|---|
| 269,248 | Wetmore | Dec. 19, 1882 |
| 758,757 | Jones | May 3, 1904 |
| 970,787 | Brown | Sept. 20, 1910 |
| 1,261,944 | Layton et al. | Apr. 9, 1918 |
| 1,388,637 | French | Aug. 23, 1921 |
| 1,987,265 | Miller | Jan. 8, 1935 |
| 2,620,041 | Chenette et al. | Dec. 2, 1952 |
| 2,641,325 | Hoffman | June 9, 1953 |
| 2,690,230 | Budesky | Sept. 28, 1954 |